US 11,571,978 B2

(12) United States Patent
Shabgard et al.

(10) Patent No.: US 11,571,978 B2
(45) Date of Patent: Feb. 7, 2023

(54) PASSIVELY COOLED HIGH POWER ELECTRIC CABLE, SYSTEM AND METHOD

(71) Applicants: The Board of Regents of the University of Oklahoma, Norman, OK (US); University of Connecticut, Farmington, CT (US); The Board of Trustees of The Leland Stanford Junior University, Stanford, CA (US)

(72) Inventors: Hamidreza Shabgard, Norman, OK (US); Amir Faghri, Los Angeles, CA (US); Kenneth Goodson, Portola Valley, CA (US); Mehdi Asheghi, Palo Alto, CA (US)

(73) Assignees: The Board of Regents of the University of Oklahoma, Norman, OK (US); The Board of the Trustees of the Leland Stanford Junior University, Stanford, CA (US); The University of Connecticut, Farmington, CT (US)

( * ) Notice: Subject to any disclaimer, the term of this patent is extended or adjusted under 35 U.S.C. 154(b) by 99 days.

(21) Appl. No.: 16/770,895

(22) PCT Filed: Jan. 10, 2020

(86) PCT No.: PCT/US2020/013145
§ 371 (c)(1),
(2) Date: Jun. 8, 2020

(87) PCT Pub. No.: WO2020/150105
PCT Pub. Date: Jul. 23, 2020

(65) Prior Publication Data
US 2021/0358657 A1   Nov. 18, 2021

Related U.S. Application Data

(60) Provisional application No. 62/793,228, filed on Jan. 16, 2019.

(51) Int. Cl.
*B60L 53/18*    (2019.01)
*B60L 53/16*    (2019.01)
(Continued)

(52) U.S. Cl.
CPC ............... *B60L 53/18* (2019.02); *B60L 53/16* (2019.02); *H01B 7/42* (2013.01); *H01B 7/423* (2013.01); *B60L 53/302* (2019.02)

(58) Field of Classification Search
CPC ... H01B 7/42; H01B 7/421–428; B60L 53/16; B60L 53/18; B60L 53/302
See application file for complete search history.

(56) References Cited

U.S. PATENT DOCUMENTS 5,269,369 A    12/1993  Faghri
5,909,099 A *   6/1999  Watanabe ............... B60L 53/34
                                                     320/108

(Continued)

FOREIGN PATENT DOCUMENTS

DE    102016112261    1/2018
WO    WO 2017/133893   8/2017

(Continued)

OTHER PUBLICATIONS

Allen et al., "Robust Heat Transfer Enhancement During Melting and Solidification of a Phase Change Material Using a Combined Heat Pipe-Metal Foam or Foil Configuration", Journal of Heat Transfer, vol. 137, Oct. 2015.

(Continued)

*Primary Examiner* — Ross N Gushi
(74) *Attorney, Agent, or Firm* — Dunlap Codding, P.C.

(57) ABSTRACT

A charging cable apparatus having a connector, an electrically-conductive cable extending from the connector, the cable configured to be connectable to a charging station for receiving a charging current from the charging station, and (Continued)

having a heat pipe with a phase change section having a wicking structure, the wicking structure having a working fluid therein during operation for receiving heat generated during current flow within the cable. The charging cable apparatus may further have an external condensing surface in fluid communication with the phase change section of the heat pipe for accelerating condensation of evaporated working fluid. The charging cable apparatus may be connected to a charging station for charging an electric battery such as a battery of an electric vehicle.

21 Claims, 5 Drawing Sheets

(51) Int. Cl.
*H01B 7/42* (2006.01)
*B60L 53/302* (2019.01)

(56) References Cited

U.S. PATENT DOCUMENTS

| | | | |
|---|---|---|---|
| 7,505,269 | B1 | 3/2009 | Cosley et al. |
| 9,287,646 | B2 | 3/2016 | Mark |
| 9,321,362 | B2 | 4/2016 | Woo et al. |
| 9,527,403 | B2 | 12/2016 | Mardall et al. |
| 9,701,210 | B2 | 7/2017 | Woo et al. |
| 9,761,976 | B2 | 9/2017 | Mark |
| 10,321,609 | B2 * | 6/2019 | Hirai .................. H05K 7/20236 |
| 2011/0284189 | A1 | 11/2011 | Sinha et al. |
| 2014/0284020 | A1 | 9/2014 | Amir et al. |
| 2015/0217654 | A1 | 8/2015 | Woo et al. |
| 2016/0200206 | A1 | 7/2016 | Woo et al. |
| 2016/0270257 | A1 | 9/2016 | Mark |
| 2017/0144558 | A1 | 5/2017 | Remisch |
| 2018/0277283 | A1 | 9/2018 | Remisch et al. |

FOREIGN PATENT DOCUMENTS

| | | |
|---|---|---|
| WO | WO 2017/162495 | 9/2017 |
| WO | WO 2018/155895 | 8/2018 |

OTHER PUBLICATIONS

"High Power Charging—CCS-based fast charging with up to 500 A", Phoenix Contact—Inspiring Innovations, Phoenix Contact GmbH & Co. KG, 2017.

"SWCC Water-Cooled Cable—Contribution to Optimum Operation of Electric Furnace", SWCC Group—Creating for the Future, SWCC Showa Cable Systems Co., Ltd., retrieved from www.swco.co.jp/ , 2018.

"High Power Cable Cooling", Application Bulletin, Arctic Chill, retrieved from www.arcticchillergroup.com, 2018.

PCT Notification of Transmittal of the International Search Report and Written Opinion regarding PCT App. No. PCT/US20/13145, dated May 7, 2020.

* cited by examiner

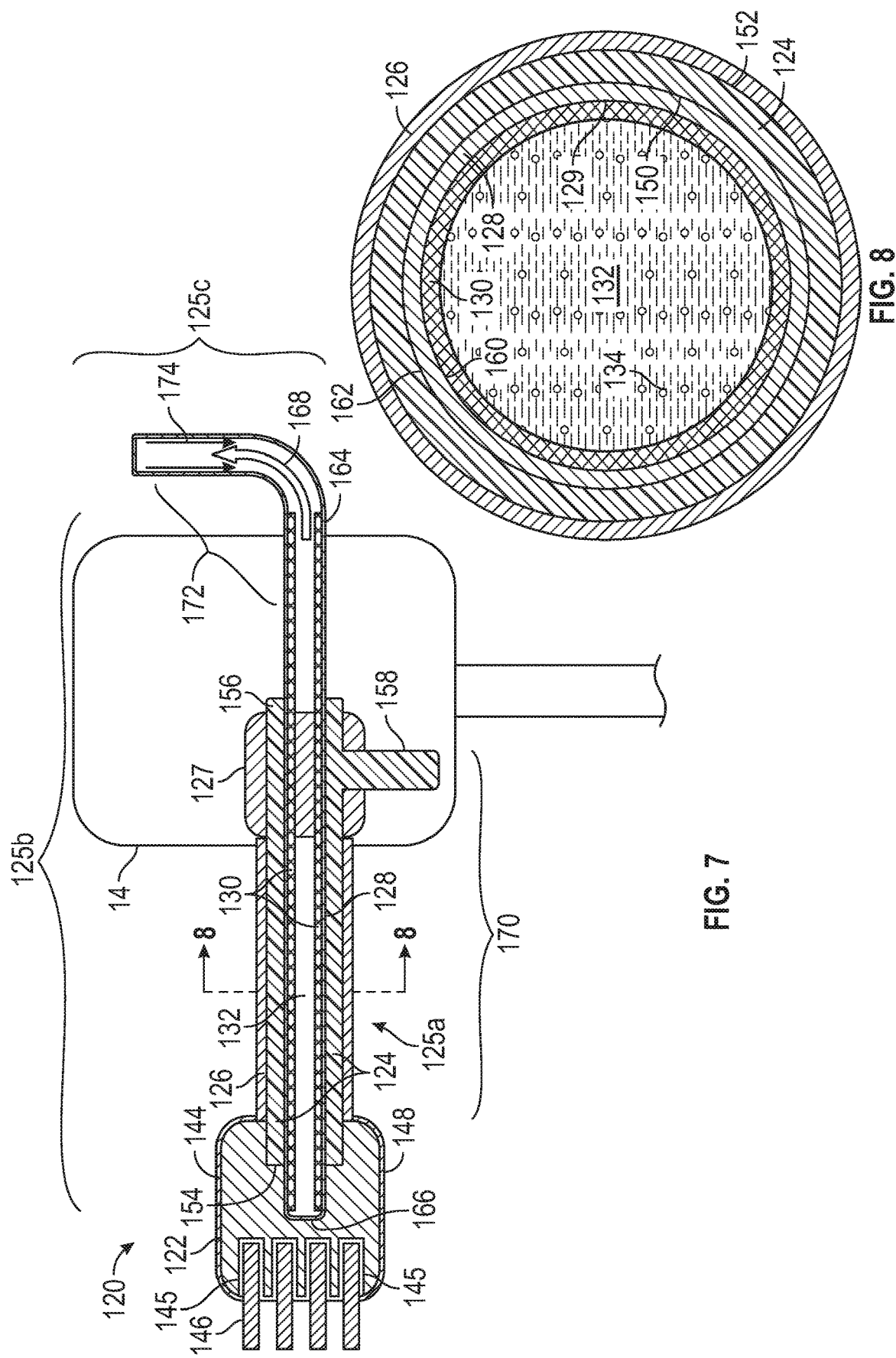

PASSIVELY COOLED HIGH POWER ELECTRIC CABLE, SYSTEM AND METHOD

BACKGROUND

The present application claims priority to the Patent Cooperation Treaty patent application identified by PCT/US2020/013145, filed on Jan. 10, 2020, which claims priority to the provisional patent application identified by U.S. Ser. No. 62/793,228 filed on Jan. 16, 2019, the entire content of which is hereby incorporated herein by reference.

BACKGROUND

Electric vehicles (EVs) have become a popular alternative to vehicles powered primarily by fossil fuels. An EV is charged by passing a current through a power receiving connector (such as an electrical cable) attached to a vehicle body, when the power receiving connector is coupled with a power supply connector which is, in turn, cable-connected to a charging station. The power receiving connectors are prone to produce excessive heat if not cooled properly. There are a number of problems associated with the limited charging capacity of the EVs, including short driving ranges and long charging times. Attempts have been made to improve short driving ranges by applying more powerful and efficient batteries. However, attempts to decrease charging time have been hindered by overheating of electrical cables and related connections due to large electrical current throughputs.

Other applications such as electrical furnaces and high power transmission lines also face limited current carrying capacity due to thermal issues. Traditionally, the higher currents have been handled with large diameter and heavy cables that increase costs and reduce mobility. Such large and heavy cables are especially problematic for mobile applications such as EVs. Attempts have been made to reduce the cable size and mass by actively cooling cables using methods such as liquid cooling and chillers. However, such active cooling methodologies increase the complexity and operational costs and may not provide sufficient cooling. For example, active cable cooling methods can typically handle power throughputs up to 1 MW at 1.2 kA in an AWG 0000 gauge cable with a copper core diameter of about 12 mm while maintaining the cable temperature below 80° C. Such power throughput results in heat generation rates of about 1 kW (corresponding to heat fluxes of $\approx 1$ W/cm$^2$) for a 3 m long cable, which increases with increasing the cable length. As such, increasing the power throughputs beyond 1 MW, and/or using longer or smaller diameter cables will lead to failure of existing active cooling methods. Quantitatively, replacing a 3 m AWG 0000 gauge cable with an AWG 3 gauge cable (conductor diameter $\approx 6$ mm) will quadruple the electrical resistance and heat generation ($\approx 4$ kW), which is beyond the limits of existing active cooling methods.

It is toward alleviating this and other disadvantages that the apparatus of the present disclosure is directed. There is a need for a passive cooling technology that can handle large heat transfer rates with minimal temperature differentials, manage greater heat fluxes, enable larger power throughputs and/or smaller and lighter conductors, and reduce the charging time of electric vehicles and other devices with minimal maintenance and power requirement. It is towards these solutions that the apparatus of the present disclosure is directed.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the present disclosure. Further, in the appended drawings, like or identical reference numerals or letters may be used to identify common or similar elements and not all such elements may be so numbered. The figures are not necessarily to scale and certain features and certain views of the figures may be shown as exaggerated in scale or in schematic in the interest of clarity and conciseness. For example, thicknesses and lengths are not limited to those shown in the drawings.

FIG. 7 is diagrammatic view of another apparatus in accordance with the present disclosure having a charging cable shown connected to a charging station.

FIG. 8 is cross sectional view taken along line 8-8 of FIG. 7.

DETAILED DESCRIPTION

Figure 1:
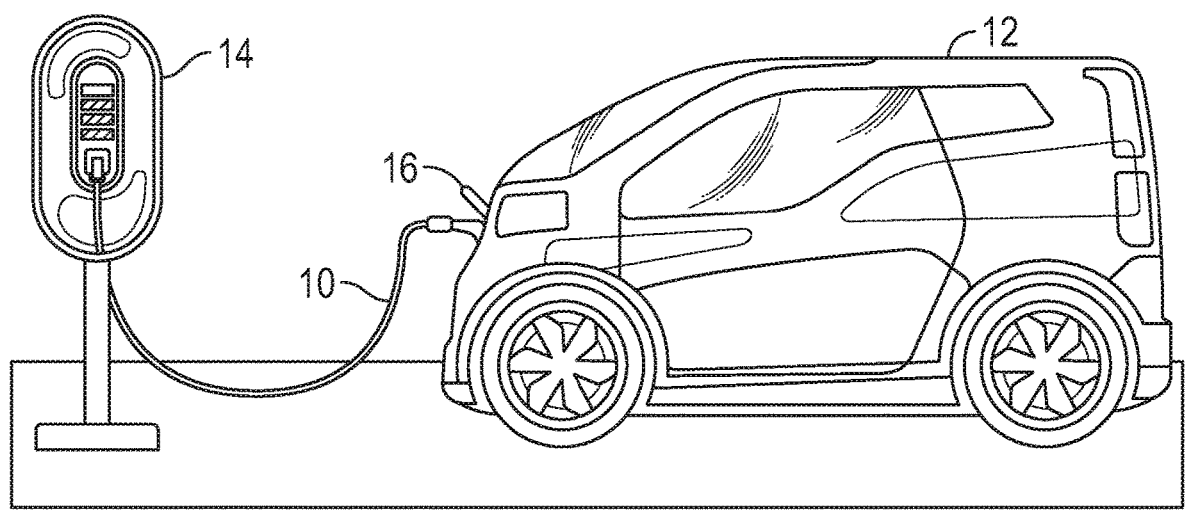
FIG. 1 is a front elevation view of an electric vehicle (EV) shown connected to a charging station by a charging cable in accordance with the present disclosure.

The present disclosure is directed to high power electric cables cooled by passive cooling. The apparatus of the present disclosure provides a passive thermal management solution for cooling high power electrical cables and related connectors with a wide range of applications including but not limited to portable high power electrical devices and equipment and electric vehicles. By passively cooling the charging cable, the disclosed apparatus may reduce the charging time for electrical equipment and electric vehicles with minimal maintenance and power equipment.

Before further describing various embodiments of the present disclosure in more detail by way of exemplary description, examples, and results, it is to be understood that the embodiments of the present disclosure are not limited in structure and application to the details as set forth in the following description. The embodiments of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the present disclosure has been described in terms of particular embodiments, it will be apparent to those of skill in the art that variations may be applied to the apparatus and/or methods and in the steps or in the sequence of steps of the methods described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the apparatus, methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the terms "at least one" or "plurality" will be understood to include one as well as any quantity more than one, including but not limited to, 2, 3, 4, 5, 6, 7, 8, 9, 10, 15, 20, 30, 40, 50, 100, or any integer inclusive therein, and/or any range described herein. The terms "at least one" or "plurality" may extend up to 100 or 1000 or more, depending on the term to which it is attached; in addition, the quantities of 100/1000 are not to be considered limiting, as higher limits may also produce satisfactory results. In addition, the use of the term "at least one of x, y and z" will be understood to include x alone, y alone, and z alone, as well as any combination of x, y and z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "a, b, c, or combinations thereof" is intended to include at least one of: a, b, c, ab, ac, bc, or abc, and if order is important in a particular context, also ba, ca, cb, cba, bca, acb, bac, or cab. Continuing with this example, expressly included are combinations that contain repeats of one or more item or term, such as bb, aaa, aab, bbc, aaabcccc, cbbaaa, cababb, and so forth. The skilled artisan will understand that typically there is no limit on the number of items or terms in any combination, unless otherwise apparent from the context.

Throughout this application, the terms "about" and "approximately" are used to indicate that a value includes the inherent variation of error for the composition, the method used to administer the composition, or the variation that exists among the objects, or study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately", where used herein when referring to a measurable value such as an amount, a temporal duration, thickness, width, length, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 75% of the time, at least 80% of the time, at least 90% of the time, at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-30 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, as well as sub-ranges within the greater range, e.g., for 1-30, sub-ranges include but are not limited to 1-10, 2-15, 2-25, 3-30, 10-20, and 20-30. Reference to a range of 1-50 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, etc., up to and including 50. Reference to a series of ranges includes ranges which combine the values of the boundaries of different ranges within the series. Thus, to illustrate reference to a series of ranges, for example, a range of 1-1,000 includes, but is not limited to, 1-10, 2-15, 2-25, 3-30, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 1 mm to 10 m therefore refers to and includes all values or ranges of values, and fractions of the values and integers within said range, including for example, but not limited to, 5 mm to 9 m, 10 mm to 5 m, 10 mm to 7.5 m, 7.5 mm to 8 m, 20 mm to 6 m, 15 mm to 1 m, 31 mm to 800 cm, 50 mm to 500 mm, 4 mm to 2.8 m, and 10 cm to 150 cm. Any two values within the range of 1 mm to 10 m therefore can be used to set a lower and an upper boundaries of a range in accordance with the embodiments of the present disclosure.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The inventive concepts of the present disclosure will be more readily understood by reference to the following examples and embodiments, which are included merely for purposes of illustration of certain aspects and embodiments thereof, and are not intended to be limitations of the disclosure in any way whatsoever. Those skilled in the art will promptly recognize appropriate variations of the apparatus, compositions, components, procedures and method shown below.

Referring now to FIG. 1, shown therein is a charging cable apparatus constructed in accordance with the present disclosure and designated by the general reference numeral 10. The charging cable apparatus 10 may be used as a charging cable to connect an electric vehicle 12 (or other device or piece of equipment in need of charging) to a charging station 14. The charging cable apparatus 10 extends from the charging station 14 and terminates in a connector which can be connected to a socket 16 of the electric vehicle 12 (or of the device in need of charging).

Figure 2:
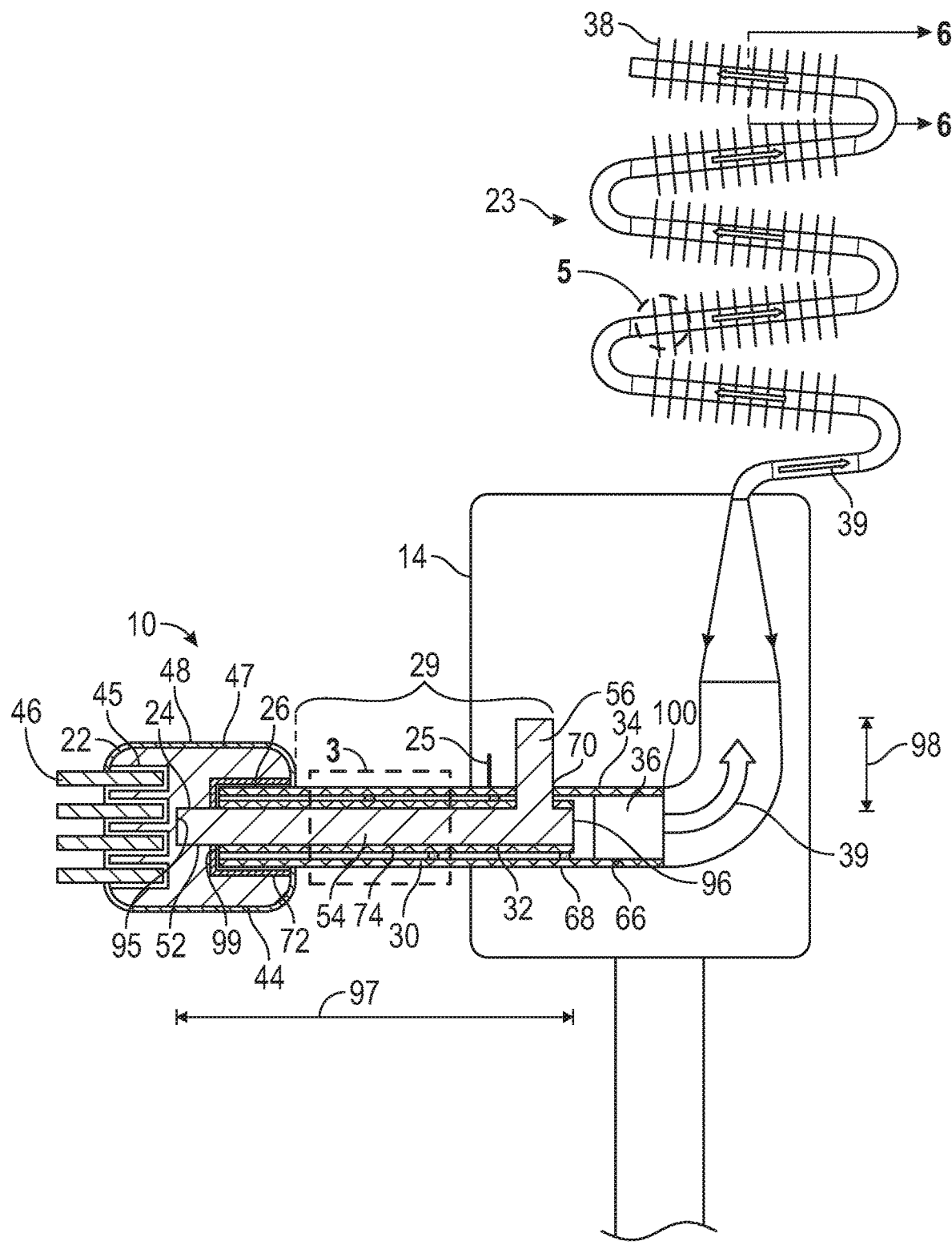
FIG. 2 is a diagrammatic, partial cross-sectional view of an apparatus including a charging cable and a condensing tube, the charging cable shown connected to a charging station.
Figure 3:
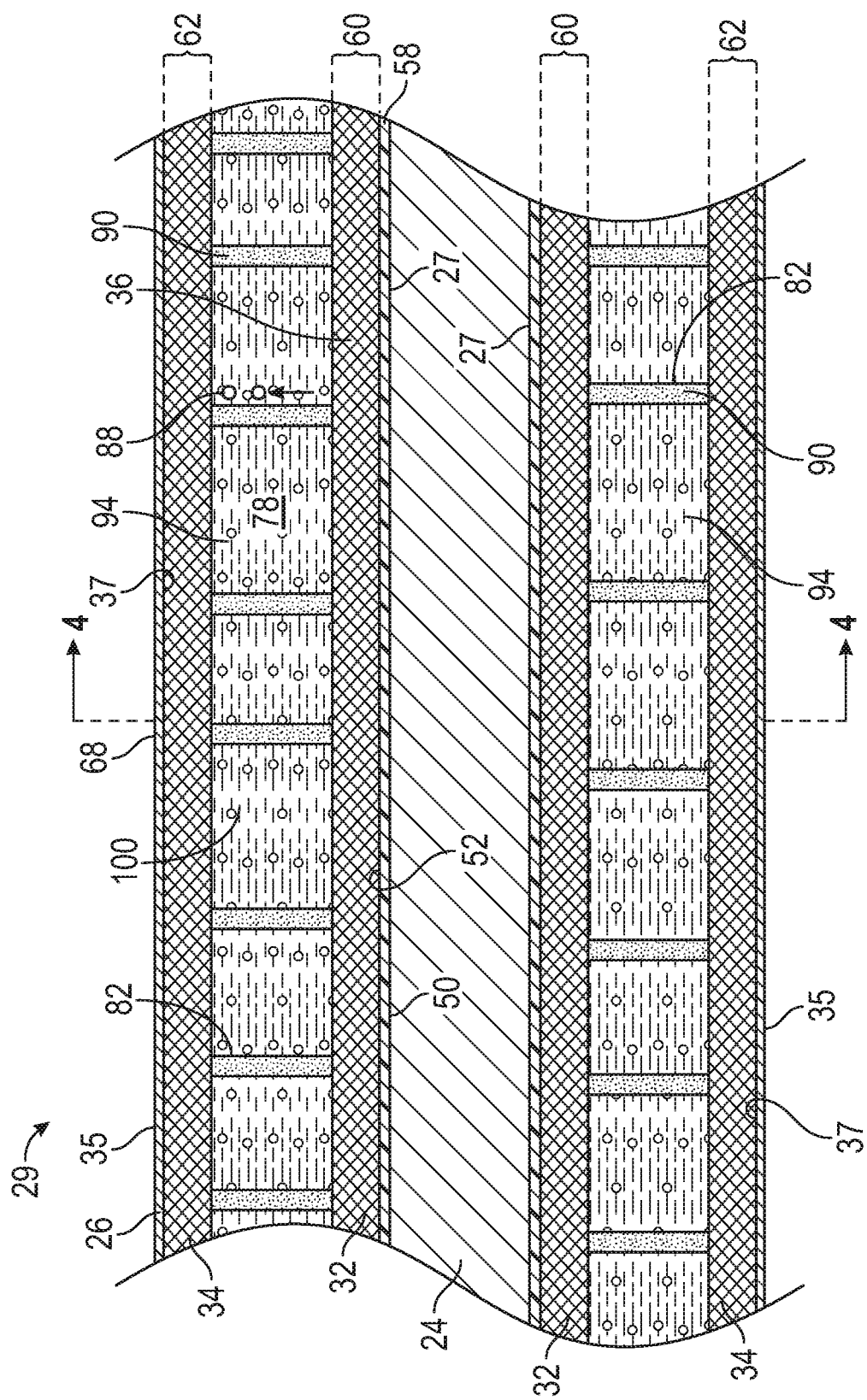
FIG. 3 is a partial enlarged view taken along line 3 of FIG. 2.
Figure 6:
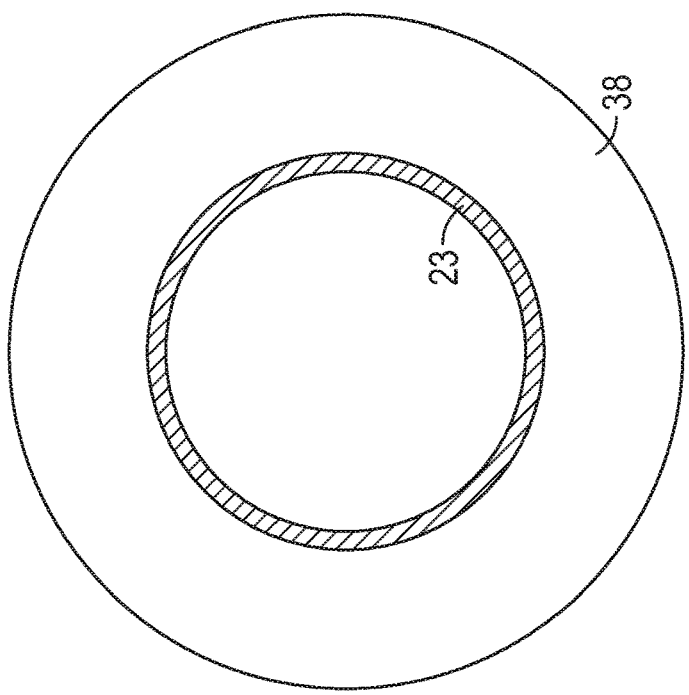
FIG. 6 is a cross sectional view taken along line 6-6 of FIG. 2.
Figure 4:
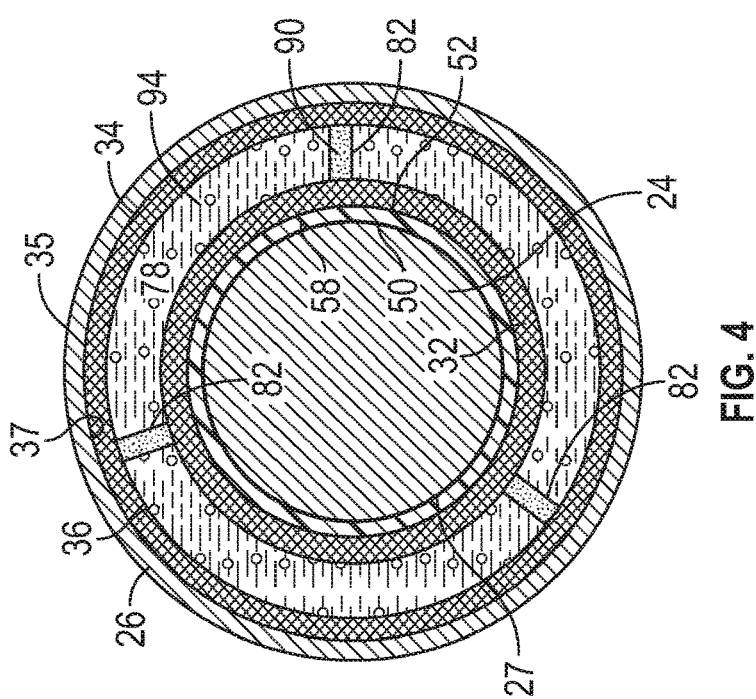
FIG. 4 is a cross sectional view taken along line 4-4 of FIG. 3.

Shown in FIGS. 2-4 is an embodiment of the charging cable apparatus 10. The charging cable apparatus 10 generally includes a connector 22, a cable 24 connected to (and in some embodiments partially embedded in) and extending from the connector 22, and a flexible heat pipe 25 including a tubular shell 26, having an outer surface 35 and an inner surface 37, extending from the connector 22 and surrounding the cable 24. The cable 24 is shown connected to the connector 22 and within the tubular shell 26. As noted above, the connector 22 can be connected to the electric vehicle 12. The cable 24 may be constructed of any suitable electrically-conductive material, including but not limited to gold, silver, copper, aluminum or graphite. The cable 24 may include two, three or more electrically insulated conductors to transfer AC or DC current to and from the vehicle. As will be explained in further detail below, the tubular shell 26 of the heat pipe 25 comprises a phase change section 29 comprising a wicking structure 30 which is coextensive with at least a portion of the cable 24 so as to receive heat generated by the cable 24. As noted above, in certain embodiments, a portion of the tubular shell 26 is embedded in the connector 22 such that it functions to receive heat generated in the connector 22 during electrical current flow.

In a non-limiting embodiment, the phase change section 29 of the charging cable apparatus 10 is in fluid communication with an external condensing surface 23 which extends from the tubular shell 26. As shown in FIG. 3, the tubular shell 26 of the phase change section 29 contains a fluid receiving space 78 between an outer surface 27 of the cable 24 and the inner surface 37 of the tubular shell 26. The wicking structure 30 in the fluid receiving space 78 is constructed to have a first wick 32 adjacent to the outer surface 27 of the cable 24 and a second wick 34 positioned adjacent the inner surface 37 of the tubular shell 26. A working fluid 36 may be positioned in the fluid receiving space 78, the fluid receiving space 78 being substantially exhausted of matter other than the working fluid 36. As will be explained in further detail below, the first wick 32, the second wick 34, and the working fluid 36 of the heat pipe 25 cooperate to promote evaporation and condensation of the working fluid 36 to reduce the temperature of the cable 24 through passive cooling methods. When in its vapor form, the working fluid 36 fills a vapor transfer space 94 which makes up the space between the first wick 32 and the second wick 34 within the fluid receiving space 78. When in its liquid form, the working fluid 36 saturates the first wick 32 and/or the second wick 34.

The external condensing surface 23 may be provided with a plurality of fins 38 to increase surface area for promoting condensation. For example, the working fluid 36, in its vapor form, may flow in an upward direction, as indicated by arrows 39, before condensing and returning to the wicking structure 30 of the phase change section 29. As shown in FIG. 2, the apparatus 10 and the external condensing surface 23 comprise a closed system.

The connector 22 may conform to requirements of at least one of a Society of Automotive Engineers J1772 connector specification, such as the J1772-2001 specification, or the J1772-2009 specification. In general, the connector 22 may have a base portion 44 and at least one socket 45 receiving a conducting pin 46 connected to the charging port of the electrical vehicle or the power receiving equipment. When the conducting pin 46 is positioned within the socket 45, the conducting pin 46 extends from the base portion 44. The connector 22 may comprise, for example, from one to 10 sockets 45. The conducting socket(s) 45 may be configured to mate with a corresponding conducting pin 46 on the electric vehicle 12. In some embodiments, the connector 22 serves as an electrical interface with an electrical load, such as a vehicle 12. The connector 22 plugs onto the conducting pins 46 16 on the electric vehicle 12. The base portion 44 forming the socket(s) 45 may be formed of any suitable solid material with sufficient electrical conductivity including but not limited to copper, aluminum, metal or polymer alloys and graphite. The base portion 44 may have a variety of shapes and, in non-limiting embodiments, can be from 10 mm to 200 mm long and a width of 10 mm to 200 mm. The base portion 44 has an external surface 47. The connector 22 may also include an electrically insulating layer 48 covering the external surface 47 of the connector 22 for safe handling. The electrically insulating layer 48 may be made from rubber, polymer, or any other non-conducting material.

The cable 24 has a current output end 95, a current input end 96, and an intermediate portion 54 therebetween. The current output end 95 may be embedded in the base portion 44 of the connector 22, as shown in FIG. 2. The current input end 96 may comprise a separate connecting piece 56 electrically connected to the intermediate portion 54 for connecting to a port of the charging station 14 to supply a charging current thereto. In a non-limiting embodiment, the current output end 95 of the cable 24 may extend into the base portion 44 of the connector 22 a distance that is about half the length of the connector 22. The cable 24 has a length 97 extending from the current output end 95 to the current input end 96. The connecting piece 56 has a length 98. In certain non-limiting embodiments, the length 97 is in a range between 10 mm and 100 m.

The cable 24 may be any cable known in the art suitable for charging an electric vehicle or piece of electrical equipment. The cable 24 optionally includes a protective covering 58, which may be constructed of a polymeric or thermoplastic material, over the outer surface 27 of the cable 24. An optional second tubular shell (not shown) may cover the protective covering 58 of the cable 24. The protective covering 58 has an inner surface 50 and an outer surface 52.

In one non-limiting embodiment, as shown in FIG. 2, the tubular shell 26 at least partially surrounds the cable 24. The tubular shell 26 may extend a distance into the connector 22, for example about half the distance that the cable 24 extends into the connector 22. The tubular shell 26 has an inner surface 66, an outer surface 68, and optionally an opening 70 through which a portion of the connecting piece 56 passes. The phase change section 29 of the tubular shell 26 may be partially embedded in the base portion 44 of the connector 22 as shown in FIG. 2. The embedded part of the tubular shell 26 is electrically insulated from the base portion 44 via a high thermal conductivity layer 72 such as a ceramic or polymeric material. The tubular shell 26 may extend beyond the current input end 96 of the cable 24. The tubular shell 26 may be formed of a variety of materials including, but not limited to corrugated stainless steel or other metallic or non-metallic materials known in the art. The length of the tubular shell 26 may be proportional to the length of the cable 24 and may range from 0.01 m to 100 m and more. The diameter of the tubular shell 26 may be from 1.1× cable diameter to 10× cable diameter.

As shown in FIG. 3, the outer surface 52 of the protective cover 58 over cable 24 may be coextensive with the tubular shell 26. In some embodiments, the phase change section 29 has a first end 99 embedded within the base portion 44 of the connector 22, and a second end 100 at (or beyond) the current input end 96 of the cable 24.

As shown in FIGS. 2-4, the first wick 32 (also referred to as an inner wick or an evaporator wick) encases at least a portion of the cable 24, and the second wick 34 (also referred to as an outer wick or a condenser wick) extends along at least a portion of the inner surface 37 of the tubular shell 26. The first wick 32 and the second wick 34 cooperate to define the fluid receiving space 78. A plurality of conduits (capillary pillars) 82 extend between the first wick 32 and the second wick 34 and into the fluid receiving space 78. The fluid receiving space 78 may be vacuumed and injected with an amount of the working fluid 36 such that substantially the only matter within the fluid receiving space is the working fluid 36. When in its vapor form, the working fluid 36 is positioned in the fluid receiving space 78. When in its liquid form, the working fluid 36 saturates the first wick 32 or the second wick 34 or both. For example, as shown in FIG. 3, in this configuration, the portion of the cable 24 covered by the first wick 32 forms an evaporator section 60 and the outer surface 35 of the tubular shell 26 (exposed to the ambient) forms a condenser section 62.

The wicking structure 30 (e.g., first wick 32 and the second wick 34) may be formed of a fibrous or sponge-like material such as, but not limited to carbon fiber, screen wick, wicking cloth, braided metal, sintered metal powder, 3d oriented wick structure or ceramic. The first wick 32 and the second wick 34 may be, but are not limited to being, between 0.1 mm and 25 mm thick. The conduits 82 may be formed from a porous material including, but not limited to, carbon fiber, screen wick, wicking cloth, braided metal, sintered metal powder, 3d oriented wick structure, ceramic or other porous material known in the art. The height of the conduits 82 may be such that they cover the distance between the first (inner) wick 32 and the second (outer) wick 34. The thickness or diameter of the conduits 82 may be, but are not limited to being, from 0.1 mm to 100 mm. By way of example, the conduits 82 may be in the form of columns or slabs. The working fluid 36 preferably has a high vapor pressure at room temperature 21° Celsius and freezing temperature below 0° Celsius. The working fluid 36 is also preferably compatible with the materials comprising the tubular shell 26. The working fluid 36 may be, but is not limited to being, water, ammonia, acetone, methanol, ethanol or other organic or inorganic solvents. When heated, the working fluid 36 becomes a working vapor 88.

In use, the working fluid 36 saturates both the first (inner) wick 32 and the second (outer) wick 34. The liquid and vapor phases of the working fluid 36 inside the tubular shell 26 are in thermodynamic equilibrium. When an electrical current passes through the cable 24, heat is generated within the cable 24. The heat dissipates from the cable 24 passing into the first wick 32 and increases the temperature of the working fluid 36 in the first wick 32. The equilibrium condition between the liquid and vapor phases of the working fluid 36 is disturbed and the working fluid 36 changes to a superheated state thereby evaporating from the first wick 32 (the evaporator section 60) to form the working vapor 88. As the working fluid 36 transforms and expands into the working vapor 88, the pressure increases within the vapor transfer space 94 of the fluid receiving space 78. The working vapor 88 filling the vapor transfer space 94 may be in a saturation state and the working vapor's temperature and pressure may be linked together according to thermodynamic constraint. Thus, increasing vapor pressure results in an increase in saturation vapor temperature. When the working vapor 88 comes in contact with the relatively cooler surface of the second wick 34 (the condenser section 62), the temperature of the working vapor 88 drops below its saturation value and causes the working vapor 88 to condense reforming the working fluid 36. The heat released by the working vapor 88 as it condenses on the second wick 34 is conducted through the second wick 34 into the tubular shell 26 and passes therefrom to the external environment by natural convection or induced air flow by an external fan or any other induced air flow.

For continuous operation, the condensed working fluid 36 (condensate) must be returned to the evaporator section 60 from the condenser section 62. The driving force for this liquid transport is the capillary pressure difference between the first wick 32 (evaporator section 60) and the second wick 34 (condenser section 62). As the liquid evaporates from the porous surface of the first wick 32, a plurality of menisci (not shown) form at a liquid-vapor interface and liquid pressure in the first wick 32, $P_{l,evap}$, drops below the corresponding saturation temperature; $P_{l,eavp}=P_{v,sat}-2\sigma\cos(\theta)/r$, where r and σ denote the pore radius of the wick and liquid surface tension, respectively, and θ is the contact angle between the meniscus and a pore wall of the first wick 32.

On the other hand, the liquid-vapor interface in the condenser section 62 is almost flat. Thus, the liquid pressure within the second wick 34 is almost the same as the vapor pressure ($P_{l,cond} \approx P_{v,sat}$). Since the vapor pressure is fairly uniform throughout the vapor transfer space 94 of the fluid receiving space 78, the noted curvature difference creates a driving pressure ($P_{l,cond} > P_{l,evap}$), which pumps the condensate from the condenser section 62 to the evaporator section 60. The conduits 82 provide liquid pathways 90 from the second wick 34 to the first wick 32.

Figure 5:
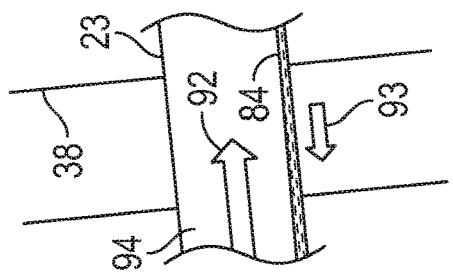
FIG. 5 is a partial enlarged view taken along circle 5 of FIG. 2.

In addition to capillary force, gravity may be used to aid the condensate return. In an optional embodiment, as noted above and as shown in FIG. 2, the external condensing surface 23 extends from the tubular shell 26 at least partially upwardly to further aide in the condensate returning to the wicking structure 30 by gravity flow. The plurality of fins 38 attached to the external condensing surface 23 may increase surface area for promoting further condensation. For example, FIG. 5 shows a schematic representation of an upward vapor flow 92 in the vapor transfer space 94 within the external condensing surface 23 and a condensed working fluid 84 flowing in a downward direction 93 in the external condensing surface 23.

The apparatus 10 of the present disclosure provides superior heat transfer characteristics such as, but not limited to, extremely high effective thermal conductivities (up to 90 times or more that of copper) and an ability to transfer large amounts of heat with small temperature differentials. Poor natural convection is usually a limiting factor in the cooling of high power cables using known devices and methods. The apparatus 10 of the present disclosure decouples the heat generation surface area (the cable 24) from the heat rejection surface area (the tubular shell 26 and/or the portion of the tubular shell 26 that extends beyond the length of the cable 24 (shown in FIG. 2), thereby allowing for increased heat rejection surface area significantly beyond that of an otherwise bare cable.

The tubular shell 26 and the cable 24 connect to the connector 22, which serves as a separable electrical interface with a load. Cooling the connector 22 is important because high temperatures may arise therein. In at least certain embodiments, the tubular shell 26 and the wicking structure 30 extends into and penetrates the connector 22 acting as a heat sink from the connector 22, thereby cooling the connector 22 due to the fluid evaporation mechanisms described above.

Referring now to FIGS. 7-8, shown therein is an alternate, non-limiting embodiment of a charging cable apparatus constructed in accordance with the present disclosure and designated by the general reference numeral 120. As with the charging cable apparatus 10, the charging cable apparatus 120 can be used as a charging cable for an electric vehicle or device or piece of electrical equipment in need of charging. The charging cable apparatus 120 generally includes a connector 122, a flexible tubular cable 124 extending from the connector 122, and a flexible heat pipe 125a having a phase change section 125b at least partially coextensive with the cable 124, and an external condensing surface 125c connected to and in fluid communication with the phase change section 125b and extending therefrom. The heat pipe 125a includes an inner tube 128 embedded at a distal end 166 within and extending from the connector 122 and surrounded by the cable 124. An outer tube 126 surrounds at least a portion of the cable 124. The cable 124 is constructed of an electrically conductive material such as gold, silver, copper, aluminum or metallic alloys and may comprise a multi-threaded material. The cable 124 is connectable to the charging station 14 for example via a large area contact 127. The inner tube 128 of the heat pipe 125a further includes a tubular wick structure 130 extending along an inner surface 129 of the inner tube 128. The tubular wick structure 130 defines and surrounds vapor transfer space 132. A working fluid 134 is contained within the tubular wicking structure 130. As discussed below, when in its vapor state, the working fluid 134 fills the vapor transfer space 132, and when in its liquid state, the working fluid 134 saturates the tubular wicking structure 130. The large area contact 127 may be positioned inside the charging station 14 and contacts a current input end 156 of the cable 124.

The term heat pipe in this description is used in a general way and is not limited to a certain type of heat pipe. All forms of heat pipes including flexible heat pipes, pulsating heat pipes, loop heat pipes, conventional and non-conventional heat pipes can be employed.

The connector 122 has a base portion 144 and at least one conducting socket 145 for receiving a conducting pin 146 (as described above). The base portion 144 has an external surface 147. The connector 122 may also include an electrically insulating layer 148 covering the external surface 47 of the connector 22 for safe handling. The electrically insulating layer 148 may be made from rubber, polymer, or any other non-conducting material. The connector 122 may be formed of substantially the same materials and have the same dimensions and industry specifications as the connector 22. The cable 124 extends from the base portion 144 and has an inner surface 150, an outer surface 152, a current output end 154, and a current input end 156. The current output end 154 is embedded in the base portion 144 of the connector 122. The cable 124 may be formed of substantially similar materials and dimensions as the cable 24. The cable 124 may include a connecting piece 158 for connecting to the charging station 14. The connecting piece 158 may be solid. The large contact area 127 may serve to provide mechanical support to a junction formed between the current input end 156 of the cable 124 and the charging station 14. As shown, the large area contact 127 may surround and overlie portions of the connecting piece 158, as well as surround and overlie portions of the cable 124. In the example shown, the connecting piece 158 extends at a non-zero degree angle from the cable 124, for example at a 90 degree angle.

The outer tube 126 extends from the base portion 144 of the connector 122 and in a typical non-limiting embodiment is not embedded in the connector 122. As noted above, the outer tube 126 surrounds a portion of the cable 124 extending between the connector 122 and the charging station 14. The outer tube 126 may be formed of a polymer such as, but not limited to, plastic, polymer, thermoplastic, rubber or other suitable material and provides electrical insulation to the cable 124.

The inner tube 128 which contains the wicking structure 130 is partially embedded at a distal end 166 in the base portion 144. The inner tube 128 has an inner surface 160, an outer surface 162, and a condenser end 164 which may be proximal to the charging station 14. The inner tube 128 extends along the inner surface 150 of the cable 124 and extends from the current input end 156 of the cable 124 to an intersection with the external condensing surface 125c, which extends therefrom in an upward direction. In certain embodiments, a portion of the inner tube 128 and the wicking structure 130 therein extends a distance beyond the current output end 154 of the cable 124 into the base portion 144 of the connector 122. The inner tube 128 may be formed of substantially the same materials as the tubular shell 76 and the outer tube 126. The inner tube 128 may be electrically insulated from the cable 124.

The tubular wicking structure 130 extends along the inner surface 150 of the inner tube 128 to surround the vapor transfer space 132. The tubular wicking structure 130 may be formed of substantially the same materials as the wicking structure 30 described above and may have, but is not limited to, a thickness in a range from 0.1 mm to 25 mm.

The inner tube 128 may be vacuumed and the wicking structure 130 injected with a saturating amount of the working fluid 134. The working fluid 134 may be any suitable matter which is able to change from liquid to vapor and back at the temperatures under which the charging cable apparatus 120 may operate. Examples of the working fluid 134 (as for the working fluid 36) include but are not limited to water, ammonia, acetone, methanol, and ethanol and other organic or inorganic solvents.

In use, the working fluid 134 may saturate the tubular wicking structure 130. Vapor and liquid phases of the working fluid 134 may come in thermodynamic equilibrium inside the inner tube 128. An amount of heat generated by an electrical current running through the cable 124 may evaporate the working fluid 134 in the wicking structure 130. The vapor enters the vapor transfer space 132 and is pushed, due to a pressure gradient, towards the condenser end 164 of inner tube 128 into the external condensing surface 125c in a direction indicated by arrow 168. In the external condensing surface 125c the vapor formed from the working fluid 134 comes in contact with a relatively cooler portion of the external condensing surface 125c where the temperature of the vapor drops below the saturation value and condensation occurs. The condensed vapor, now a liquid condensate, then flows back into the wicking structure 130 towards the distal end 166 of the inner tube 128 (as indicated by arrow 174). In this configuration, the section of the inner tube 128 in contact with the cable 124 constitutes an evaporator section, and the section of the inner tube extending beyond the cable 124 and the external condensing surface 125c exposed to ambient air together form a condenser portion 172 of the charging cable apparatus 120.

The inner tube 128 and the cable 124 connect to the connector 122, which serves as a separable electrical interface with a load. Cooling the connector 122 is important since the high temperatures may arise in the connector 122. The inner tube 128 extends into and penetrates the connector 122 and cools the connector 122 by evaporation of the working fluid 134 within the tubular wicking structure 130.

The evaporation and condensation principles discussed above in relation to the charging cable apparatus 10 are also applicable to the charging cable apparatus 120. Both charging cable apparatuses 10 and 120 benefit from the superior heat transfer characteristics described herein, such as extremely high effective thermal conductivities and an ability to transfer large amounts of heat with small temperature differentials. Current cables known in the art have poor natural convection, which is usually a limiting factor in cooling of high power cables. The apparatuses disclosed herein decouple the heat generation surface area (cable) from the heat rejection surface area (extending the tubular shell 26 or the inner tube 128 beyond the length of the cable 24 and cable 124, respectively) thereby allowing for increasing the heat rejection surface area significantly beyond that of a bare cable.

The present disclosure is directed, in non-limiting embodiments, to the following apparatuses, systems, and methods:

Clause 1. A charging cable apparatus, comprising (1) a connector comprising an electrically conductive base portion, and at least one conducting socket within the base portion, (2) a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end; and (3) a heat pipe comprising a phase change section having a wicking structure, the phase change section coextensive with at least a portion of the intermediate portion of the cable so as to receive heat generated during current flow within the cable.

Clause 2. The charging cable apparatus of clause 1, further comprising an external condensing surface in fluid communication with the phase change section of the heat pipe and optionally partially elevated above the phase change section.

Clause 3. The charging cable apparatus of clause 2, wherein the external condensing surface further comprises at least one external fin.

Clause 4. The charging cable apparatus of clause 3, further comprising a fan positioned to blow air across the at least one external fin.

Clause 5. The charging cable apparatus of any one of clauses 1-4, wherein the current output end of the cable is embedded within the base portion of the connector.

Clause 6. The charging cable apparatus of clause 5, wherein the heat pipe has a first end and a second end, wherein the first end is connected to the base portion of the connector, and the second end is positioned at the current input end of the cable.

Clause 7. The charging cable apparatus of any one of clauses 1-6, wherein the phase change section of the heat pipe comprises a tubular shell having an inner surface and an outer surface, the tubular shell having an inner space defining a fluid receiving space, and wherein the wicking structure is positioned within the fluid receiving space and at least partially engages the inner surface of the tubular shell.

Clause 8. The charging cable apparatus of clause 7, wherein the fluid receiving space of the phase change section is equipped with a working fluid changeable between a vapor state and a liquid state.

Clause 9. The charging cable apparatus of any one of clauses 1-8, wherein the heat pipe surrounds at least a portion of the cable.

Clause 10. The charging cable apparatus of clause 9, wherein at least a portion of the wicking structure engages the cable, said cable-engaging portion of the wicking material comprising a first wick, and wherein the portion of the wicking structure at least partially engaging the inner surface of the tubular shell comprises a second wick, the first wick and second wick having a vapor transfer space therebetween.

Clause 11. The charging cable apparatus of clause 10, wherein the wicking structure further comprises a plurality of conduits extending between the first wick and the second wick and in fluid communication therewith.

Clause 12. The charging cable apparatus of clause 7, wherein the cable has a tubular shape having an outer surface, and an inner surface surrounding an inner space, wherein the tubular shell of the phase change section of the heat pipe is positioned within the inner space of the cable such that the outer surface of the tubular shell engages the inner surface of the cable and is substantially coextensive therewith.

Clause 13. The charging cable apparatus of any one of clauses 1-12, wherein the first end of the heat transfer pipe is embedded within the base portion of the connector.

Clause 14. The charging cable apparatus of any one of clauses 1-13, wherein the tubular shell is constructed of a metal.

Clause 15. The charging cable apparatus of any one of clauses 1-14, wherein the wicking structure is constructed of a material selected from the group consisting of carbon fiber, graphite, screen wick, wicking cloth, sintered metal powder, 3D-printed wick structures, and braided metal.

Clause 16. The charging cable apparatus of any one of clauses 1-12, comprising a connector adapted to charge an electric battery of an electric vehicle.

Clause 17. A charging cable system, comprising the charging cable apparatus of any one of clauses 1-16; and a charging station, wherein the current input end of the cable of the charging cable apparatus is connected to the charging station enabling the cable to receive a charging current from the charging station.

Clause 18. The charging cable system of clause 17, wherein the phase change section of the heat pipe of the charging cable apparatus comprises a tubular shell having an inner surface and an outer surface, the tubular shell having an inner space defining a fluid receiving space, and wherein the wicking structure is positioned within the fluid receiving space and at least partially engages the inner surface of the tubular shell.

Clause 19. The charging cable system of clause 18, wherein the fluid receiving space of the phase change section is equipped with a working fluid changeable between a vapor state and a liquid state.

Clause 20. A method of charging an electric battery, comprising connecting an electric battery to the charging cable apparatus of the charging cable systems of any one of clauses 17-19; and actuating the charging cable system to provide electric current to the electric battery.

While the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the inventive concepts of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the present disclosure. Changes may be made in the devices, components and methods described herein, and in the steps or the sequence of steps of the methods described herein without departing from the spirit and scope of the present disclosure. Further, while various embodiments of the present disclosure have been described in claims herein below, it is not intended that the present disclosure be limited to these particular claims. Applicants reserve the right to amend, add to, or replace the claims indicated herein below in subsequent patent applications.

What is claimed is:

1. A charging cable apparatus, comprising:
   a connector comprising an electrically conductive base portion, and at least one conducting socket within the base portion;
   a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end; and
   a heat pipe comprising a phase change section having a wicking structure, the phase change section coextensive with at least a portion of the intermediate portion of the cable so as to receive heat generated during current flow within the cable.

2. The charging cable apparatus of claim 1, further comprising an external condensing surface in fluid communication with the phase change section of the heat pipe.

3. The charging cable apparatus of claim 2, wherein the external condensing surface further comprises at least one external fin.

4. The charging cable apparatus of claim 3, further comprising a fan positioned to blow air across the at least one external fin.

5. The charging cable apparatus of claim 1, wherein the current output end of the cable is embedded within the base portion of the connector.

6. The charging cable apparatus of claim 5, wherein the heat pipe has a first end and a second end, wherein the first end is connected to the base portion of the connector, and the second end is positioned at the current input end of the cable.

7. The charging cable apparatus of claim 1, wherein the first end of the heat transfer pipe is embedded within the base portion of the connector.

8. The charging cable apparatus of claim 1, wherein the wicking structure is constructed of a material selected from the group consisting of carbon fiber, graphite, screen wick, wicking cloth, sintered metal powder, 3D printed wick structures and braided metal.

9. The charging cable apparatus of claim 1, comprising a connector adapted to charge an electric battery of an electric vehicle.

10. The charging cable apparatus of claim 1, wherein the phase change section of the heat pipe comprises a tubular shell having an inner surface and an outer surface, the tubular shell having an inner space defining a fluid receiving space, and wherein the wicking structure is positioned within the fluid receiving space and at least partially engages the inner surface of the tubular shell.

11. The charging cable apparatus of claim 10, wherein the fluid receiving space of the phase change section is equipped with a working fluid changeable between a vapor state and a liquid state.

12. The charging cable apparatus of claim 10, wherein the heat pipe surrounds at least a portion of the cable.

13. The charging cable apparatus of claim 10, wherein the tubular shell is constructed of a metal.

14. A charging cable system, comprising:
   a charging cable apparatus, comprising:
      a connector comprising an electrically conductive base portion, and at least one conducting socket embedded in the base portion;
      a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end; and
      a heat pipe comprising a phase change section having a wicking structure, the phase change section coextensive with at least a portion of the intermediate portion of the cable so as to receive heat generated during current flow within the cable; and
   a charging station, wherein the current input end of the cable is connected to the charging station to enable the cable to receive a charging current from the charging station.

15. The charging cable system of claim 14, wherein the phase change section of the heat pipe comprises a tubular shell having an inner surface and an outer surface, the tubular shell having an inner space defining a fluid receiving space, and wherein the wicking structure is positioned within the fluid receiving space and at least partially engages the inner surface of the tubular shell.

16. The charging cable system of claim 15, wherein the fluid receiving space of the phase change section is equipped with a working fluid changeable between a vapor state and a liquid state.

17. A method of charging an electric battery, comprising:
connecting an electric battery to a charging cable apparatus of a charging cable system, the charging cable apparatus comprising:
   a connector comprising an electrically conductive base portion, and at least one conducting socket embedded in the base portion;
   a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end; and
   a heat pipe comprising a phase change section having a wicking structure, the phase change section coextensive with at least a portion of the intermediate portion of the cable so as to receive heat generated during current flow within the cable, wherein the electric battery is connected to the connector of the charging cable apparatus; and
actuating the charging cable system causing the charging cable apparatus to provide electric current to the electric battery.

18. The method of claim 17, wherein the electric battery is a battery of an electric vehicle.

19. A charging cable apparatus, comprising:
a connector comprising an electrically conductive base portion, and at least one conducting socket within the base portion;
a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end;
a heat pipe comprising a phase change section having a wicking structure, the phase change section coextensive with and surrounding at least a portion of the intermediate portion of the cable so as to receive heat generated during current flow within the cable, wherein the phase change section of the heat pipe comprises a tubular shell having an inner surface and an outer surface, the tubular shell having an inner space defining a fluid receiving space, and wherein the wicking structure is positioned within the fluid receiving space and at least partially engages the inner surface of the tubular shell; and
wherein at least a portion of the wicking structure engages the cable, said cable-engaging portion of the wicking material comprising a first wick, and wherein the portion of the wicking structure at least partially engaging the inner surface of the tubular shell comprises a second wick, the first wick and second wick having a vapor transfer space therebetween.

20. The charging cable apparatus of claim 19, wherein the wicking structure further comprises a plurality of conduits extending between the first wick and the second wick and in fluid communication therewith.

21. A charging cable apparatus, comprising:
a connector comprising an electrically conductive base portion, and at least one conducting socket within the base portion;
a cable extending from the base portion of the connector, the cable constructed of an electrically conductive material, the cable comprising a current output end connected to the base portion of the connector, a current input end configured to be connectable to a charging station for receiving a charging current from the charging station, and an intermediate portion between the current output end and current input end;
a heat pipe comprising a phase change section having a wicking structure, the phase change section coextensive with and surrounding at least a portion of the intermediate portion of the cable so as to receive heat generated during current flow within the cable, wherein the phase change section of the heat pipe comprises a tubular shell having an inner surface and an outer surface, the tubular shell having an inner space defining a fluid receiving space, and wherein the wicking structure is positioned within the fluid receiving space and at least partially engages the inner surface of the tubular shell; and
wherein the cable has a tubular shape having an outer surface, and an inner surface surrounding an inner space, wherein the tubular shell of the phase change section of the heat pipe is positioned within the inner space of the cable such that the outer surface of the tubular shell engages the inner surface of the cable and is substantially coextensive therewith.

* * * * *